United States Patent
Tatebe

(10) Patent No.: US 9,280,183 B2
(45) Date of Patent: Mar. 8, 2016

(54) ADVANCED TECHNIQUES FOR BONDING METAL TO PLASTIC

(75) Inventor: Masashige Tatebe, Kakogawa (JP)

(73) Assignee: Apple Inc., Cupertino, CA (US)

( * ) Notice: Subject to any disclaimer, the term of this patent is extended or adjusted under 35 U.S.C. 154(b) by 786 days.

(21) Appl. No.: 13/239,190

(22) Filed: Sep. 21, 2011

(65) Prior Publication Data

US 2012/0250250 A1    Oct. 4, 2012

Related U.S. Application Data

(60) Provisional application No. 61/470,662, filed on Apr. 1, 2011, provisional application No. 61/476,688, filed on Apr. 18, 2011.

(51) Int. Cl.
| | |
|---|---|
| *B05D 1/36* | (2006.01) |
| *G06F 1/16* | (2006.01) |
| *B29C 45/14* | (2006.01) |
| *B29L 31/34* | (2006.01) |
| *B29K 81/00* | (2006.01) |
| *B29K 705/00* | (2006.01) |

(52) U.S. Cl.
CPC ........ *G06F 1/1656* (2013.01); *B29C 45/14311* (2013.01); *B29C 2045/14868* (2013.01); *B29K 2081/04* (2013.01); *B29K 2705/00* (2013.01); *B29L 2031/3481* (2013.01); *Y10T 29/49982* (2015.01)

(58) Field of Classification Search
CPC ............ G06F 1/1656; B29C 45/14311; B29C 2045/14868; B29K 2705/00; B29K 2081/04; B29L 2031/3481; Y10T 29/49982

USPC .......... 29/527.1–527.4, 592.1, 842, 843, 848; 361/679.55, 679.01, 679.02; 427/404, 427/243

See application file for complete search history.

(56) References Cited

U.S. PATENT DOCUMENTS

| | | |
|---|---|---|
| 2,647,079 A | 7/1953 | Burnham |
| 2,812,295 A | 11/1957 | Patrick |
| 2,990,304 A | 6/1961 | Cybriwsky et al. |
| 3,316,866 A | 11/1965 | Orlin |

(Continued)

FOREIGN PATENT DOCUMENTS

| | | |
|---|---|---|
| CN | 1362125 A | 8/2002 |
| CN | 1306526 C | 3/2007 |

(Continued)

OTHER PUBLICATIONS

Hajdu, "Chapter 7", 1990, William Andrew Publishing from www.knovel.com, http://www2.bren.ucsb.edu/~dturney/port/papers/Electroless/07.pdf pp. 193-206.*

(Continued)

*Primary Examiner* — Ryan J Walters

(57) ABSTRACT

Techniques for combining a polymer layer and a metal layer to form a multi-layer structure are disclosed. In one embodiment, an intermediate layer having pores, openings or voids is secured to the metal layer, and then the polymer layer is molded to the intermediate layer, whereby the pores, openings or voids in the surface of the intermediate layer serve to facilitate securing of the polymer layer to the metal layer. The multi-layer structure is suitable for use in as a portion of a housing for an electronic device, such as a portable electronic device.

25 Claims, 6 Drawing Sheets

(56) References Cited

U.S. PATENT DOCUMENTS

| | | |
|---|---|---|
| 3,526,694 A | 9/1970 | Lemelson |
| 3,615,432 A | 10/1971 | Jenkins et al. |
| 3,645,777 A | 2/1972 | Sierad |
| RE28,225 E | 11/1974 | Heseltine et al. |
| 4,247,600 A | 1/1981 | Adachi et al. |
| 4,269,947 A | 5/1981 | Inata et al. |
| 4,347,428 A | 8/1982 | Conrad et al. |
| 4,531,705 A | 7/1985 | Nakagawa et al. |
| 4,547,649 A | 10/1985 | Butt et al. |
| 4,564,001 A | 1/1986 | Maeda |
| 4,651,453 A | 3/1987 | Doyle |
| 4,686,352 A | 8/1987 | Nawrot et al. |
| 4,756,771 A | 7/1988 | Brodalla et al. |
| 4,931,366 A | 6/1990 | Mullaney |
| 4,993,148 A | 2/1991 | Adachi et al. |
| 5,215,864 A | 6/1993 | Laakmann |
| 5,224,197 A | 6/1993 | Zanoni et al. |
| 5,288,344 A | 2/1994 | Peker et al. |
| 5,417,905 A | 5/1995 | Lemaire et al. |
| 5,645,964 A | 7/1997 | Nohr et al. |
| 5,719,379 A | 2/1998 | Huang et al. |
| 5,744,270 A | 4/1998 | Pearlman et al. |
| 5,789,466 A | 8/1998 | Birmingham et al. |
| 5,808,268 A | 9/1998 | Balz |
| 5,837,086 A | 11/1998 | Leeb et al. |
| 5,872,699 A | 2/1999 | Nishii et al. |
| 5,925,847 A | 7/1999 | Rademacher et al. |
| 5,943,799 A | 8/1999 | Xu et al. |
| 5,971,617 A | 10/1999 | Woelki et al. |
| 6,007,929 A | 12/1999 | Robertson et al. |
| 6,101,372 A | 8/2000 | Kubo |
| 6,169,266 B1 | 1/2001 | Hughes |
| 6,325,868 B1 | 12/2001 | Kim et al. |
| 6,331,239 B1 | 12/2001 | Shirota et al. |
| 6,480,397 B1 | 11/2002 | Hsu et al. |
| 6,540,667 B2 | 4/2003 | Hickman |
| 6,574,096 B1 | 6/2003 | Difonzo et al. |
| 6,590,183 B1 | 7/2003 | Yeo |
| 6,633,019 B1 | 10/2003 | Gray |
| 6,746,724 B1 | 6/2004 | Robertson et al. |
| 6,802,952 B2 | 10/2004 | Hsu et al. |
| 6,821,305 B2 | 11/2004 | Yan |
| 6,966,133 B2 | 11/2005 | Krings et al. |
| 6,996,425 B2 | 2/2006 | Watanabe |
| 7,065,820 B2 | 6/2006 | Meschter |
| 7,134,198 B2 | 11/2006 | Nakatani et al. |
| 7,181,172 B2 | 2/2007 | Sullivan et al. |
| 7,225,529 B2 | 6/2007 | Wang |
| 7,284,396 B2 | 10/2007 | Barron et al. |
| 7,459,373 B2 | 12/2008 | Yoo |
| 7,508,644 B2 | 3/2009 | Cheung et al. |
| 7,530,491 B2 | 5/2009 | Lasch et al. |
| 7,622,183 B2 | 11/2009 | Shirai et al. |
| 7,636,974 B2 | 12/2009 | Meschter et al. |
| 7,691,189 B2 | 4/2010 | En et al. |
| 8,192,815 B2 | 6/2012 | Weber et al. |
| 8,367,304 B2 | 2/2013 | Heley et al. |
| 8,379,678 B2 | 2/2013 | Zhang et al. |
| 8,379,679 B2 | 2/2013 | Zhang et al. |
| 8,451,873 B2 | 5/2013 | Zhang |
| 8,663,806 B2 | 3/2014 | Weber et al. |
| 8,761,216 B2 | 6/2014 | Zhang |
| 8,809,733 B2 | 8/2014 | Scott et al. |
| 8,842,351 B2 | 9/2014 | Lawrence et al. |
| 8,879,266 B2 | 11/2014 | Jarvis et al. |
| 8,893,975 B2 | 11/2014 | Sanford et al. |
| 8,993,921 B2 | 3/2015 | Browning et al. |
| 9,034,166 B2 | 5/2015 | Tatebe et al. |
| 2001/0030002 A1 | 10/2001 | Zheng et al. |
| 2002/0058737 A1 | 5/2002 | Nishiwaki et al. |
| 2002/0097440 A1 | 7/2002 | Paricio et al. |
| 2002/0109134 A1 | 8/2002 | Iwasaki et al. |
| 2002/0130441 A1 | 9/2002 | Robinson et al. |
| 2002/0160145 A1 | 10/2002 | Bauhoff |
| 2003/0006217 A1 | 1/2003 | Dance |
| 2003/0024898 A1 | 2/2003 | Natsume et al. |
| 2003/0074814 A1 | 4/2003 | Krings et al. |
| 2003/0225189 A1* | 12/2003 | Fuller ........................ 523/176 |
| 2004/0000490 A1 | 1/2004 | Chang |
| 2005/0023022 A1 | 2/2005 | Kriege et al. |
| 2005/0034301 A1 | 2/2005 | Wang |
| 2005/0115840 A1 | 6/2005 | Dolan |
| 2005/0127123 A1 | 6/2005 | Smithers |
| 2005/0158576 A1 | 7/2005 | Groll |
| 2005/0211680 A1 | 9/2005 | Li et al. |
| 2005/0263418 A1 | 12/2005 | Bastus |
| 2006/0055084 A1 | 3/2006 | Yamaguchi et al. |
| 2006/0066771 A1 | 3/2006 | Hayano et al. |
| 2006/0105542 A1 | 5/2006 | Yoo |
| 2006/0225918 A1* | 10/2006 | Chinda et al. ............... 174/260 |
| 2007/0018817 A1 | 1/2007 | Marmaropoulos et al. |
| 2007/0045893 A1 | 3/2007 | Asthana et al. |
| 2007/0053504 A1 | 3/2007 | Sato et al. |
| 2007/0262062 A1 | 11/2007 | Guth |
| 2007/0275263 A1 | 11/2007 | Groll |
| 2008/0152859 A1 | 6/2008 | Nagai |
| 2008/0165485 A1 | 7/2008 | Zadesky et al. |
| 2008/0166007 A1 | 7/2008 | Hankey |
| 2008/0216926 A1 | 9/2008 | Guo et al. |
| 2008/0241478 A1 | 10/2008 | Costin et al. |
| 2008/0274375 A1 | 11/2008 | Ng et al. |
| 2008/0295263 A1 | 12/2008 | Meschter et al. |
| 2008/0299408 A1 | 12/2008 | Guo et al. |
| 2008/0311369 A1 | 12/2008 | Yokoyama et al. |
| 2009/0017242 A1 | 1/2009 | Weber et al. |
| 2009/0019737 A1 | 1/2009 | Moreno |
| 2009/0091879 A1 | 4/2009 | Lim |
| 2009/0104949 A1 | 4/2009 | Sato et al. |
| 2009/0190290 A1 | 7/2009 | Lynch et al. |
| 2009/0194444 A1 | 8/2009 | Jones |
| 2009/0197116 A1 | 8/2009 | Cheng et al. |
| 2009/0236143 A1 | 9/2009 | Nakamura |
| 2009/0260871 A1 | 10/2009 | Weber et al. |
| 2009/0305168 A1 | 12/2009 | Heley et al. |
| 2010/0015578 A1 | 1/2010 | Falsafi et al. |
| 2010/0061039 A1 | 3/2010 | Sanford et al. |
| 2010/0065313 A1 | 3/2010 | Takeuchi et al. |
| 2010/0159273 A1 | 6/2010 | Filson et al. |
| 2010/0183869 A1 | 7/2010 | Lin et al. |
| 2010/0209721 A1 | 8/2010 | Irikura et al. |
| 2010/0209731 A1 | 8/2010 | Hamano |
| 2010/0294426 A1 | 11/2010 | Nashner |
| 2010/0300909 A1 | 12/2010 | Hung |
| 2011/0008618 A1 | 1/2011 | Weedlun |
| 2011/0048755 A1 | 3/2011 | Su et al. |
| 2011/0051337 A1 | 3/2011 | Weber et al. |
| 2011/0089039 A1 | 4/2011 | Nashner et al. |
| 2011/0089067 A1 | 4/2011 | Scott et al. |
| 2011/0123737 A1 | 5/2011 | Nashner |
| 2011/0186455 A1 | 8/2011 | Du et al. |
| 2011/0193928 A1 | 8/2011 | Zhang et al. |
| 2011/0193929 A1 | 8/2011 | Zhang et al. |
| 2011/0194574 A1 | 8/2011 | Zhang et al. |
| 2011/0253411 A1 | 10/2011 | Hum et al. |
| 2011/0315667 A1 | 12/2011 | Reichenbach et al. |
| 2012/0043306 A1 | 2/2012 | Howerton et al. |
| 2012/0081830 A1 | 4/2012 | Yeates et al. |
| 2012/0100348 A1 | 4/2012 | Brookhyser et al. |
| 2012/0248001 A1 | 10/2012 | Nashner |
| 2012/0275130 A1 | 11/2012 | Hsu et al. |
| 2013/0075126 A1 | 3/2013 | Nashner et al. |
| 2013/0083500 A1 | 4/2013 | Prest et al. |
| 2013/0129986 A1 | 5/2013 | Heley et al. |
| 2014/0009873 A1 | 1/2014 | Nashner |
| 2014/0134429 A1 | 5/2014 | Weber et al. |
| 2014/0186654 A1 | 7/2014 | Zhang |
| 2014/0363608 A1 | 12/2014 | Russell-Clarke et al. |
| 2014/0367369 A1 | 12/2014 | Nashner et al. |
| 2014/0370325 A1 | 12/2014 | Nashner et al. |
| 2015/0093563 A1 | 4/2015 | Runge et al. |
| 2015/0132541 A1 | 5/2015 | McDonald et al. |

(56) References Cited

U.S. PATENT DOCUMENTS

FOREIGN PATENT DOCUMENTS

| CN | 201044438 Y | 2/2008 |
| CN | 101204866 | 6/2008 |
| CN | 102173242 A | 9/2011 |
| DE | 195 23 112 | 6/1996 |
| DE | 102005048870 A1 | 4/2007 |
| EP | 0031463 | 7/1981 |
| EP | 0 114 565 A1 | 8/1984 |
| EP | 121150 A1 | 10/1984 |
| EP | 0234121 | 9/1987 |
| EP | 0 633 585 A | 1/1995 |
| EP | 0 997 958 A1 | 5/2000 |
| EP | 2 399 740 A1 | 12/2011 |
| EP | 2488369 B1 | 3/2014 |
| GB | 788 329 A | 12/1957 |
| JP | 57-149491 A | 9/1982 |
| JP | 03 013331 A | 1/1991 |
| JP | 03 138131 A | 6/1991 |
| JP | 3-203694 A | 9/1991 |
| JP | 06-126192 | 5/1994 |
| JP | 06-212451 | 8/1994 |
| JP | 06-320104 | 11/1994 |
| JP | 7-204871 A | 8/1995 |
| JP | 2000-000167 | 1/2000 |
| JP | 2002/370457 | 12/2002 |
| JP | 2003055794 | 2/2003 |
| JP | 2005/22924 | 1/2005 |
| JP | A2006-138002 | 6/2006 |
| JP | 2008 087409 A | 4/2008 |
| WO | WO 98/53451 | 11/1998 |
| WO | WO 0077883 | 12/2000 |
| WO | WO 01/15916 A1 | 3/2001 |
| WO | WO 0134408 | 5/2001 |
| WO | WO 2006/124279 A2 | 11/2006 |
| WO | WO 2007/088233 A1 | 8/2007 |
| WO | WO 2008/092949 A1 | 8/2008 |
| WO | WO 2009/051218 A1 | 4/2009 |
| WO | WO 2010/095747 A1 | 8/2010 |
| WO | WO 2010/111798 A1 | 10/2010 |
| WO | WO 2010/135415 | 11/2010 |
| WO | WO 2010/135415 A2 | 11/2010 |
| WO | WO 2011/047325 A1 | 4/2011 |

OTHER PUBLICATIONS

Annerfors et al., "Nano Molding Technology on Cosmetic Aluminum Parts in Mobile Phones", Division of Production and Materials Engineering, LTH, 2007.
"Thermal Shock Resistant Conformal Coating", Product Data Sheet, Dymax Corporation, Jul. 9, 2007, pp. 1-2.
"Marking Lasers: Marking without Limitations", Trumpf Inc., Sep. 10, 2007, pp. 1-36.
"UV-Curing Sheet Adhesives", ThreeBond Technical News, Issued Jul. 1, 2009, 8 pages.
Chang, "Lasers Make Other Metals Look Like Gold", New York Times, nytimes.com, 2 pgs., Jan. 31, 2008.
"Database EPI" Week 201107 Thomas Scientific, London, GB; AN 2010-Q46184, Nov. 17, 2010, 1 pg.
"DP2UV Basick System 2 W", ROBA Technology + Services GmbH, Aug. 2008, 2 pgs.

* cited by examiner

ADVANCED TECHNIQUES FOR BONDING METAL TO PLASTIC

CROSS-REFERENCE TO RELATED APPLICATIONS

This application claims priority benefit of: (I) U.S. Provisional Application No. 61/470,662, filed Apr. 1, 2011, and entitled "ADVANCED TECHNIQUES FOR BONDING METAL TO PLASTIC," which is hereby incorporated herein by reference; and (ii) U.S. Provisional Application No. 61/476,688, filed Apr. 18, 2011, and entitled "ADVANCED TECHNIQUES FOR BONDING METAL TO PLASTIC," which is hereby incorporated herein by reference.

BACKGROUND

Conventionally, a portable electronic device has a housing that encases various structures as well as electrical components of the portable electronic device. These housing tend to be either plastic or metal. While housing have been able to use in combination of plastic and metal, their combination together is problematic in robust, low profile designs. Hence, there remains a need for improved techniques to use a combination of metal and plastic in housing designs for portable electronic devices.

SUMMARY

The invention pertains to techniques for combining a polymer layer and a metal layer to form a multi-layer structure. In one embodiment, an intermediate layer having pores, openings or voids is secured to the metal layer, and then the polymer layer is molded to the intermediate layer, whereby the pores, openings or voids in the surface of the intermediate layer serve to facilitate securing of the polymer layer to the metal layer. The multi-layer structure is suitable for use in as a portion of a housing for an electronic device, such as a portable electronic device.

The invention can be implemented in numerous ways, including as a method, system, device, or apparatus. Several embodiments of the invention are discussed below.

As a method for forming a multi-layer structure for an electronic device, one embodiment can, for example, include at least the operations of: obtaining a metal layer; placing an intermediate layer on the metal layer, the intermediate layer including openings or voids at least at an exposed surface; and forming a polymer-based layer on the exposed surface of the intermediate layer.

As a method for forming a housing for a portable electronic device, one embodiment can, for example, include at least: providing a metal housing layer for the housing for the portable electronic device; plating the metal layer with a porous metal layer; molding a polymer housing layer onto the porous metal layer; and subsequently attaching one or more internal structural components internal to the housing.

As a consumer electronic device, one embodiment can, for example, include at least at least one housing assembly. The at least one housing assembly can include at least: a first housing layer, a second housing layer, and an intermediate porous layer. The intermediate porous layer is interposed between at least a portion of the first housing layer and the second housing layer. The intermediate porous layer can be formed on the first housing layer, and the second housing layer can be formed on the intermediate porous layer.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention pertains to techniques for combining a polymer layer and a metal layer to form a multi-layer structure. In one embodiment, an intermediate layer having pores, openings or voids is secured to the metal layer, and then the polymer layer is molded to the intermediate layer, whereby the pores, openings or voids in the surface of the intermediate layer serve to facilitate securing of the polymer layer to the metal layer. The multi-layer structure is suitable for use in as a portion of a housing for an electronic device, such as a portable electronic device.

The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts. It should be appreciated that the drawings are generally not drawn to scale, and at least some features of the drawings have been exaggerated for ease of illustration.

Embodiments are discussed below with reference to FIGS. 1-7B. However, those skilled in the art will readily appreciate that the detailed description given herein with respect to these figures is for explanatory purposes as the invention extends beyond these limited embodiments.

Figure 1:
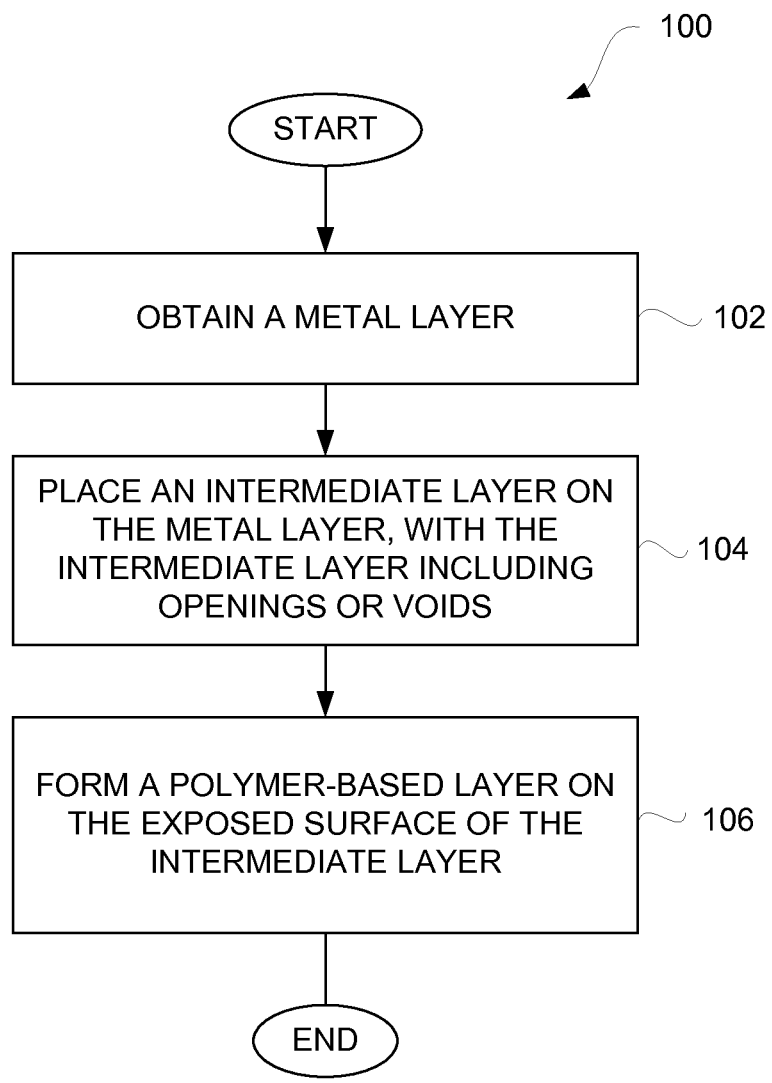
FIG. 1 is a multi-layer structure formation process according to one embodiment.

FIG. 1 is a multi-layer structure formation process 100 according to one embodiment. The multi-layer structure formation process 100 is a process that can be used in to manufacture or assemble of structural components for a variety of different purposes. As one example, the multilayer structure being formed can be used for at least a portion of a housing for an electronic device, such as a portable electronic device.

The multi-layer structure formation process 100 can initially obtain 102 a metal layer. Next, an intermediate layer can be placed 104 on the metal layer. The intermediate layer is typically also a metal layer that can be placed 104 on the metal layer in a variety of different ways. For example, the intermediate layer can be placed 104 on the metal layer by a plating process, a deposition process, or some other process suitable for securing a thin metal layer to the metal layer (base metal layer). The intermediate layer can, in one embodiment, pertain to a thin metal layer, such as a thin layer of nickel, zinc or copper, that inherently or through processing includes pores, openings or voids.

After the intermediate layer has been placed 104 on the metal layer, a polymer-based layer can be formed 106 on the exposed surface of the intermediate layer. Here, the formation 106 of the polymer-based layer can be achieved through an injection molding process whereby a molten polymer is dispensed onto the intermediate layer and formed into the polymer-based layer. When the polymer-based layer is being formed 106, the molten polymer is able to embed itself within in the various pores, openings or voids in the intermediate layer.

The resulting multi-layer structure is thus a structure formed from the metal layer, the intermediate layer and the polymer-based layer. Each of the layers can be relatively thin, such as on the order of 1 mm or less. Although securing a polymer-based layer to a metal layer directly is not easily achieved given the differing characteristics of the materials, through use of the intermediate layer, the resulting multi-layer structure is able to be securely bonded together. More particularly, the intermediate layer, being a metal, can be bonded to the base metal layer through a plating process or deposition process, both of which can form thin layers which are strongly secured to the base metal layer. Additionally, since the intermediate layer includes pores, openings or voids, the molding of the polymer-based layer onto the exposed surface of the intermediate layer enables the polymer to at least partially fill into the pores, openings or voids prior to being cured. Consequently, the pores, openings or voids enable the polymer-based layer to be strongly secured to the intermediate layer and thus to the base metal layer. The resulting multilayer structure is thus a strongly bonded, thin structure that is suitable for a variety of purposes, including the formation of at least a portion of a housing for an electronic device.

Figure 2A:
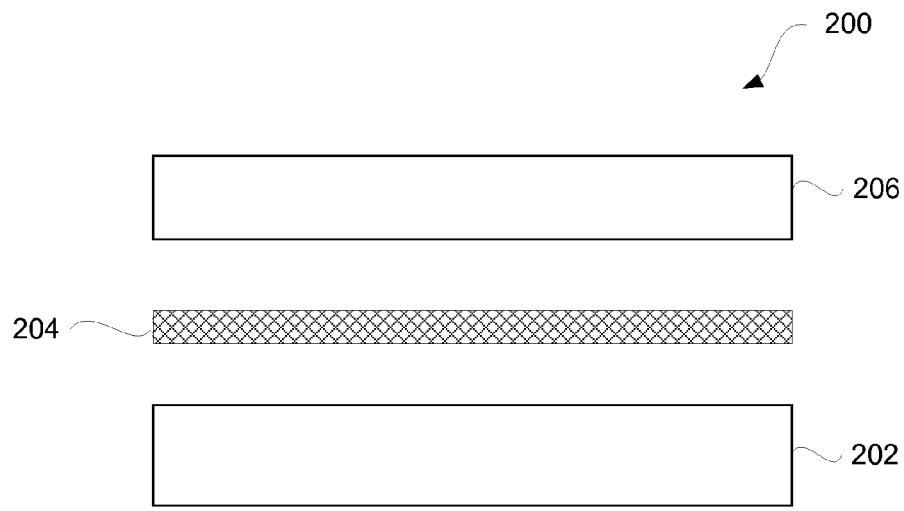
FIGS. 2A and 2B illustrate assembly of a multi-layer structure according to one embodiment.
Figure 2B:
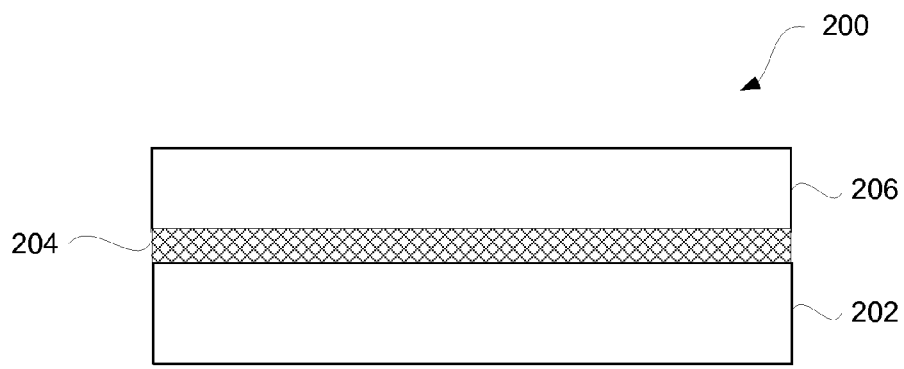

FIGS. 2A and 2B illustrate assembly of a multi-layer structure 200 according to one embodiment. The multi-layer structure 200 is shown disassembled in FIG. 2A, and is shown assembled in FIG. 2B. The multi-layer structure 200 is a structure that results from a metal layer 202, an intermediate layer 204 and a polymer-based layer 206. As shown in FIG. 2A, each of the layers is rather thin because the multi-layer structure 200 is typically thin. For example, in one embodiment, each of the layers have a thickness of less than 1 mm, and the thickness of the multi-layer structure 200 is less than 3 mm. The thickness of each of the layers can also differ. The metal layer 202 can be formed of aluminum, stainless steel, or any other metal that can be plated. The intermediate layer 204 can, for example, be formed of nickel, zinc, or copper. The intermediate layer 204 is porous and the pores are small, for example such as a diameter of approximately one to several microns. The thickness of the intermediate layer 204 can vary depending on the plated material. For example, the thickness of the intermediate layer 204 can be on the order of about 0.5 to 3 microns. The intermediate layer 204 may itself be formed in multiple layers, such as when an initial strike plating is used. One example of multiple layers for the intermediate layer 204 would be an initial nickel strike plating followed by a zinc plating. The polymer-based layer 206 can be formed of a polymer material, such as Polyphenylene Sulfide (PPS), glass-reinforced PPS, polycarbonate or other engineered plastics, which bond well with the intermediate layer 204.

Other polymers may be used though some may bond better if a primer is first applied to the intermediate layer 204, such as a hot melting primer film.

Additionally, although not illustrated in FIGS. 2A and 2B, some or all of the multi-layer structure 200 can also be subjected to one or more finishing operations. Examples of finishing operations include polishing, anodizing, painting, marking, and the like. The metal layer 202, when formed of aluminum, can, for example, be anodized.

Figure 3A:
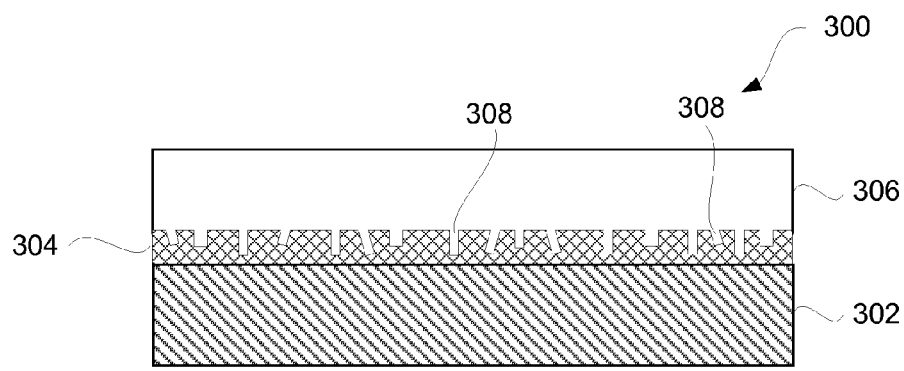
FIG. 3A illustrates a cross-sectional view of a multi-layer structure according to another embodiment.

FIG. 3A illustrates a cross-sectional view of a multi-layer structure 300 according to another embodiment. The multi-layer structure 300 includes a metal layer 302, an intermediate layer 304 and a polymer-based layer 206. Similar to that shown in FIG. 2B, the intermediate layer 304 is bonded to the metal layer 302, and then the polymer-based layer 306 is bonded to the intermediate layer 304. More particularly, as illustrated in FIG. 3A, at least a surface opposing the polymer-based layer 306 includes a plurality of pores, openings or voids 308. In FIG. 3A, the pores, openings or voids 308 are arbitrarily configured such that their placement, size or depth tends to be arbitrary.

Figure 3B:
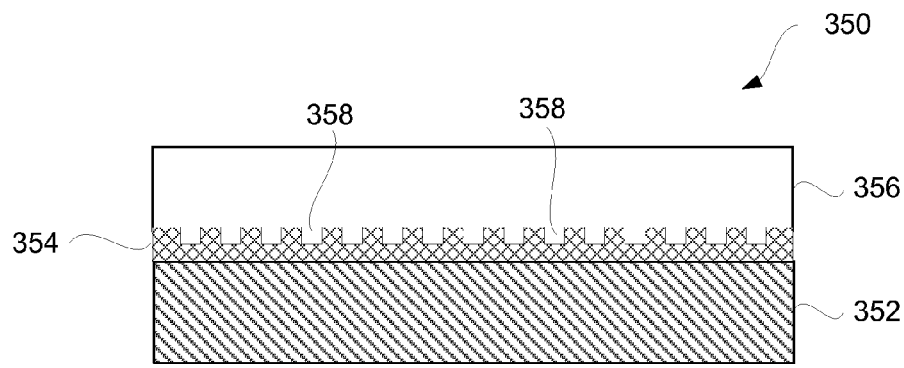
FIG. 3B illustrates a cross-sectional view of a multi-layer structure according to still another embodiment.

FIG. 3B illustrates a cross-sectional view of a multi-layer structure 350 according to still another embodiment. The multi-layer structure 350 includes a metal layer 352, an intermediate layer 354 and a polymer-based layer 256. Similar to that shown in FIG. 2B, the intermediate layer 354 is bonded to the metal layer 352, and then the polymer-based layer 356 is bonded to the intermediate layer 354. More particularly, as illustrated in FIG. 3B, at least a surface opposing the polymer-based layer 356 includes a plurality of pores, openings or voids 358. In FIG. 3B, the pores, openings or voids 358 are configured by controlled processing that their placement, size or depth tends to be uniform. For example, an etch process using an acid (e.g., nitric acid) can be used to uniformly form the pores, openings or voids 358.

Figure 4:
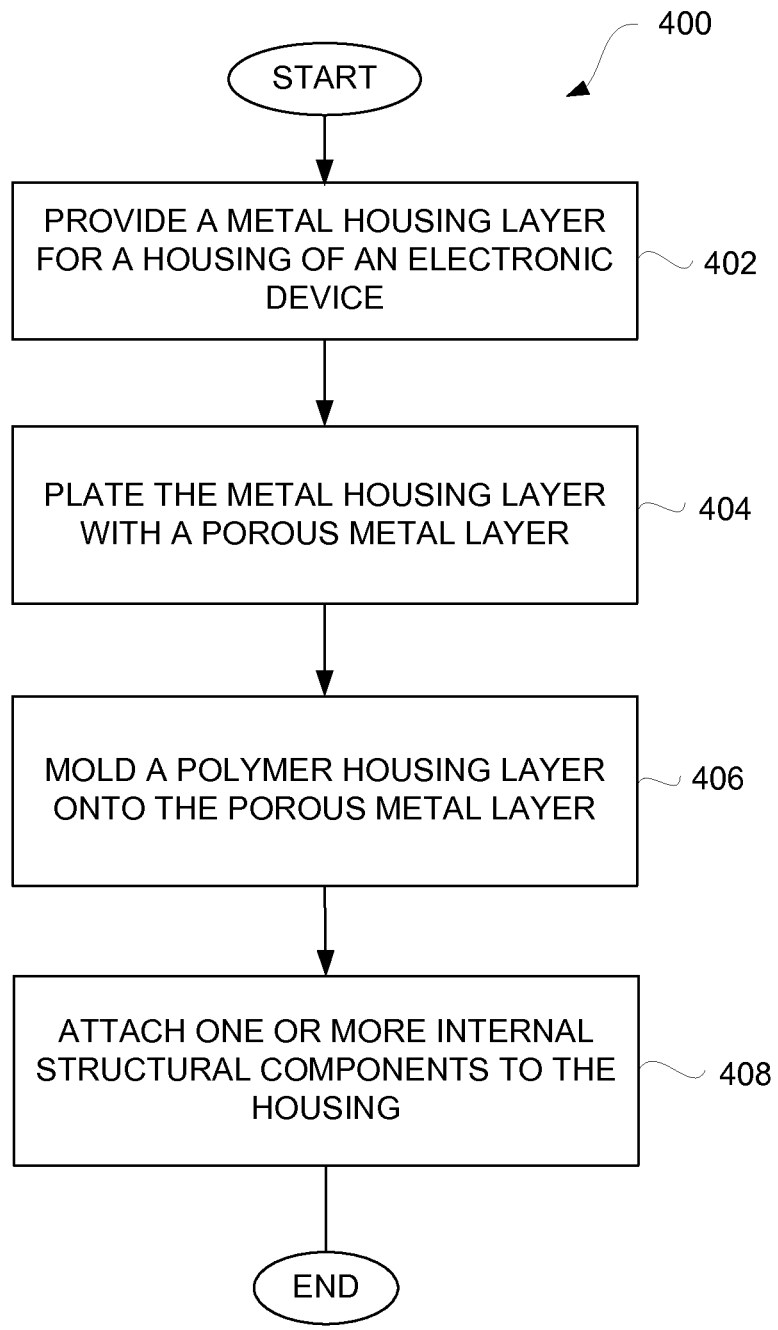
FIG. 4 is a multi-layer structure formation process according to another embodiment.

FIG. 4 is a multi-layer structure formation process 400 according to another embodiment. The multi-layer structure formation process 400 is a process that can be used in to manufacture or assemble a portion of a housing for an electronic device, such as a portable electronic device.

The multi-layer structure formation process 400 can initially provide 402 a metal housing layer for a housing of an electronic device. Next, the metal housing layer can be plated 404 with a porous metal layer. Here, the metal housing layer is formed of metal and can be plated, through electroplating, to form the porous metal layer. Although electroplating does not typically produce a porous metal layer, the electroplating of Nickel onto aluminum can be performed such that the plating yields the porous metal layer. Here, the plating can be referred to as porous electro-plating which yields the desired porous metal layer. Alternatively, additional processing can serve to form openings or voids in the metal layer that is plated onto the metal housing layer. For example, the additional processing can include an etching process using, for example, an acid (e.g., nitric acid for Ni removal).

Next, a polymer housing layer can be molded 406 onto the porous metal layer. Here, the polymer housing layer can be molded 406 through injection molding of a polymer into a mold to form the polymer housing layer on the porous metal layer. Through the injection molding, the polymer being injected prior to being cured also at least partially fills the pores, openings or voids in the porous metal layer. After the porous metal layer has been cured, the housing formed by the multi-layer structure can be used as a portion of a housing for an electronic device. In such case, one or more structural components can thereafter be attached 408 to the housing.

Further processing can also be performed to couple other structural components to the multilayer housing so as to form the electronic device.

Given that the multi-layer structure can be used for electronic devices, and often compact electronic devices, the structural components tend to be rather small. For example, a structural component is typically thin, particularly when used with portable electronic devices, such as on the order of thickness of less than 5 mm, or in some cases less than 1 mm.

Figure 5A:
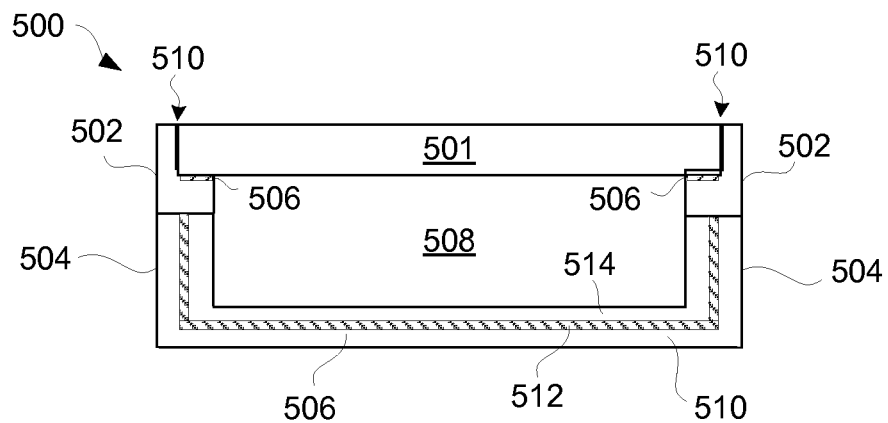
FIGS. 5A and 5B illustrate cross-sectional views of an electronic device housing according to one embodiment.
Figure 5B:
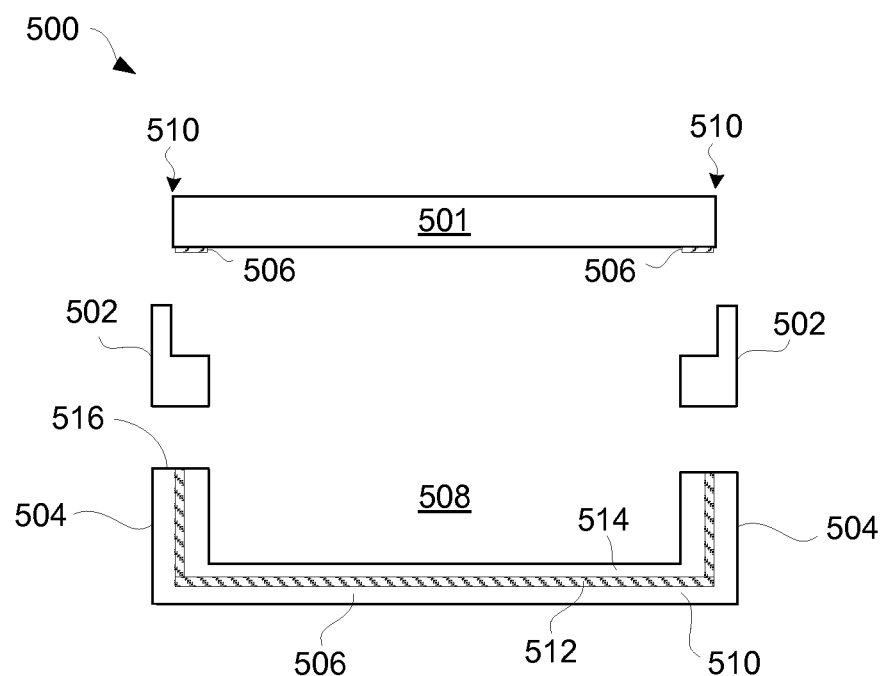

FIGS. 5A and 5B illustrate cross-sectional views of an electronic device housing 500 according to one embodiment. The electronic device housing 500 includes an outer housing member 501 supported and protected by a protective side member 502. The protective side member 502 being positioned adjacent sides of the outer housing member 501. The protective side members 502 can provide a thin layer of material positioned tightly adjacent sides of the outer housing member 501, thereby buffering impact at the sides of the outer housing member 501. The protective side member 502 can also support the outer housing member 501 and can serve to secure the outer housing member 501 to other portions of the electronic device housing 500. In one embodiment, the protective side member 502 extends around all sides of the outer housing member 501. In another embodiment, the protective side member 502 extends around those of the sides of the outer housing member 501 that would otherwise be exposed.

As shown in FIG. 5A, the outer housing member 501 can be secured to a multi-layer support structure 504 of the electronic device housing 500. The multi-layer support structure 504 can, for example, be an outer housing member for the electronic device housing 500.

The protective side member 502 can be secured tightly adjacent the sides of the outer housing member 501 using an adhesive 506. In one embodiment, the adhesive 506 can be applied as a layer of adhesive that is provided around a periphery of an inner side of the outer housing member 501. The adhesive 506 can thus serve to secure the protective side member 502 against the sides of the outer housing member 501. Also, the adhesive 506 can, for example, be a temperature activated adhesive which, once activated, can form a strong bond between the outer housing member 501 and the peripheral protective side member 502 via the adhesive 508. An internal space 508 is provided internal to the electronic device housing 500 whereby various electrical components can be attached, affixed or placed so as to provide electronic operations for the electronic device.

The various members, parts or assemblies of the electronic device housing 500 can be formed of any of a variety of materials, e.g., glass, polymers or metal. In one embodiment, the outer housing member 501 is glass, and the protective side member 502 is be formed from polymer (e.g., thermoplastic). More particularly, in some embodiments, the protective side member 502 can be a structurally strengthened polymer (e.g., thermoplastic). As an example, the protective side member 502 can be a polymer, such as polyarylamide, nylon or polycarbonate, which can be structurally strengthened by including glass fibers. For example, some examples of some structurally strengthened polymers include 50% glass filled nylon and 30% glass filled polycarbonate.

The multi-layer support structure 504 is formed from a plurality of layers as discussed above. For example, the multi-layer support structure 504 Formed from metal or polymer (e.g., plastic). The multi-layer support structure 504 is formed from an outer layer 510, an intermediate layer 512 and an inner layer 514. In one embodiment, the outer layer 510 is a metal layer, the intermediate layer 512 is a metal layer formed (e.g., plated) on the outer layer 510, and the inner layer 514 is a polymer layer. In an alternative embodiment, the inner layer 514 is a metal layer, the intermediate layer 512 is a metal layer formed e.g., plated) on the inner layer 514, and the outer layer is a polymer layer.

FIG. 5B is a cross-sectional assembly diagram for the electronic device housing 500 shown in FIG. 5A, according to one embodiment. The outer housing member 501 has a top surface and a bottom surface. The bottom surface of the outer housing member 501 has adhesive 506 applied as a layer of adhesive that is provided around a periphery of the bottom surface of the outer housing member 501. The protective side member 502 can then be placed or formed adjacent the sides of the outer housing member 501. Moreover, the protective side member 502 can also be adjacent and secured to an upper side portion 516 of the support structure 504. When the protective side member 502 are provided at the sides (i.e., edges) of the outer housing member 501, the protective side member 502 provides a buffer layer (e.g., bumper) that dampens impact induced at the sides of the outer housing member 501 of the electronic device housing 500.

As previously discussed, the components being assembled can represent portions of a housing for electronic devices, such as portable electronic devices. Those portable electronic devices that are small and highly portable can be referred to as handheld electronic devices. A handheld electronic device may, for example, function as a media player, phone, internet browser, email unit or some combination of two or more of such. A handheld electronic device generally includes a housing and a display area.

Figure 6A:
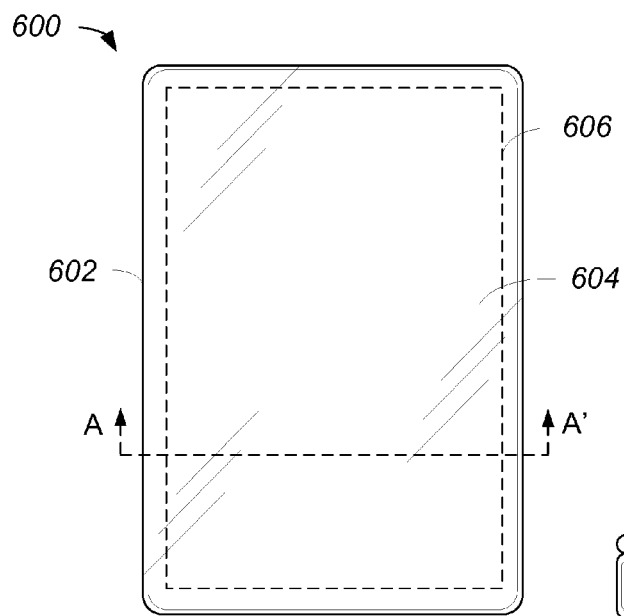
FIGS. 6A and 6B are diagrammatic representations of electronic device according to one embodiment.
Figure 6B:
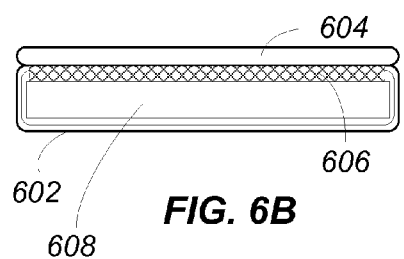

FIGS. 6A and 6B are diagrammatic representations of electronic device 600 according to one embodiment. FIG. 6A illustrates a top view for the electronic device 600, and FIG. 6B illustrates a cross-sectional side view for electronic device 600 with respect to reference line A-A'. Electronic device 600 can include multi-layer housing 602 that has cover window 604 (e.g., glass or plastic cover) as a top surface. The multi-layer housing 602 can be formed from a plurality of layers of material (e.g., see FIGS. 2A, 2B, 3A and 3B). Cover window 604 is primarily transparent so that display assembly 606 is visible through cover window 604. Display assembly 606 can, for example, be positioned adjacent cover window 604. Multi-layer housing 602 can also contain internal electrical components besides the display assembly, such as a controller (processor), memory, communications circuitry, etc. Display assembly 606 can, for example, include a LCD module. By way of example, display assembly 606 may include a Liquid Crystal Display (LCD) that includes a Liquid Crystal Module (LCM). In one embodiment, cover window 604 can be integrally formed with the LCM. Multi-layer housing 602 can also include an opening 608 for containing the internal electrical components to provide electronic device 600 with electronic capabilities. In one embodiment, multi-layer housing 602 may need not include a bezel for cover window 604. Instead, cover window 604 can extend across the top surface of multi-layer housing 602 such that the edges of cover window 604 can be aligned (or substantially aligned) with the sides of multi-layer housing 602. The edges of cover window 604 can remain exposed. Although the edges of cover window 604 can be exposed as shown in FIGS. 6A and 6B, in alternative embodiment, the edges can be further protected. As one example, the edges of cover window 604 can be recessed (horizontally or vertically) from the outer sides of multi-layer housing 602. As another example, the edges of cover window 604 can be protected by additional material placed around or adjacent the edges of cover window 604.

Cover window 604 may generally be arranged or embodied in a variety of ways. By way of example, cover window 604 may be configured as a protective translucent piece that is positioned over an underlying display (e.g., display assembly 606) such as a flat panel display (e.g., LCD) or touch screen display (e.g., LCD and a touch layer). Alternatively, cover window 604 may effectively be integrated with a display, i.e., a translucent window may be formed as at least a portion of a display. Additionally, cover window 604 may be substantially integrated with a touch sensing device such as a touch layer associated with a touch screen. In some cases, cover window 604 can serve as the outer most layer of the display.

Figure 7A:
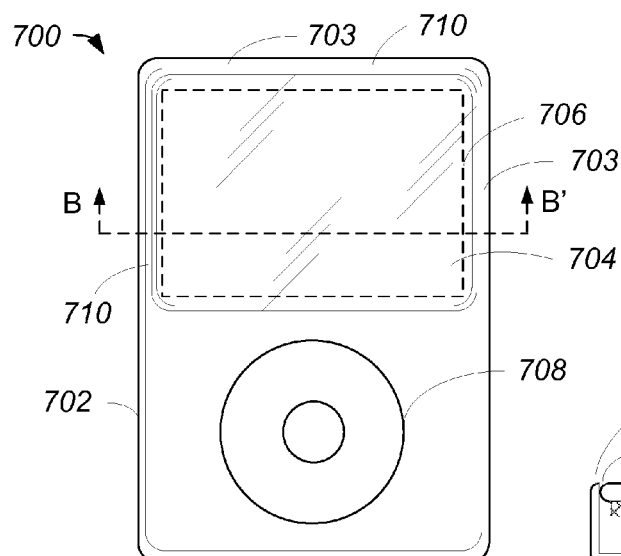
FIGS. 7A and 7B are diagrammatic representations of electronic device according to another embodiment.
Figure 7B:
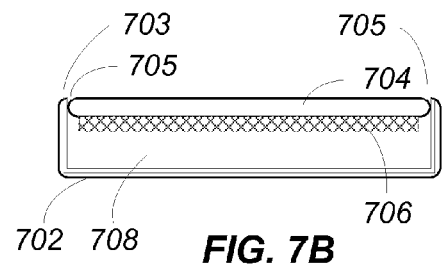

FIGS. 7A and 7B are diagrammatic representations of electronic device 700 according to another embodiment. FIG. 7A illustrates a top view for electronic device 700, and FIG. 7B illustrates a cross-sectional side view for electronic device 700 with respect to reference line B-B'. Electronic device 700 can include multi-layer housing 702 that has cover window 704 (e.g., glass or plastic cover) as a top surface. The multi-layer housing 702 can be formed from a plurality of layers of material (e.g., see FIGS. 2A, 2B, 3A and 3B). In this embodiment, cover window 704 can be protected by side surfaces 703 of multi-layer housing 702. Here, cover window 704 does not fully extend across the top surface of multi-layer housing 702; however, the top surface of side surfaces 703 can be adjacent to and aligned vertically with the outer surface of cover window 704. Since the edges of cover window 704 can be rounded for enhanced strength, there may be gaps 705 that are present between side surfaces 703 and the peripheral edges of cover window 704. Gaps 705 are typically very small given that the thickness of cover window 704 is thin (e.g., less than 3 mm). However, if desired, gaps 705 can be filled by a material. The material can be plastic, rubber, metal, etc. The material can conform in gap 705 to render the entire front surface of electronic device 700 flush, even across gaps 705 proximate the peripheral edges of cover window 704. The material filling gaps 705 can be compliant. The material placed in gaps 705 can implement a gasket. By filling the gaps 705, otherwise probably undesired gaps in the multi-layer housing 702 can be filled or sealed to prevent contamination (e.g., dirt, water) forming in the gaps 705. Although side surfaces 703 can be integral with multi-layer housing 702, side surface 703 could alternatively be separate from multi-layer housing 702 and, for example, operate as a bezel for cover window 704.

Cover window 704 is primarily transparent so that display assembly 706 is visible through cover window 704. Display assembly 706 can, for example, be positioned adjacent cover window 704. Multi-layer housing 702 can also contain internal electrical components besides the display assembly, such as a controller (processor), memory, communications circuitry, etc. Display assembly 706 can, for example, include a LCD module. By way of example, display assembly 706 may include a Liquid Crystal Display (LCD) that includes a Liquid Crystal Module (LCM). In one embodiment, cover window 704 is integrally formed with the LCM. Multi-layer housing 702 can also include an opening 708 for containing the internal electrical components to provide electronic device 700 with electronic capabilities.

The front surface of electronic device 700 can also include user interface control 708 (e.g., click wheel control). In this embodiment, cover window 704 does not cover the entire front surface of electronic device 700. Electronic device 700 essentially includes a partial display area that covers a portion of the front surface.

Cover window 704 may generally be arranged or embodied in a variety of ways. By way of example, cover window 704 may be configured as a protective translucent piece that is positioned over an underlying display (e.g., display assembly 706) such as a flat panel display (e.g., LCD) or touch screen display (e.g., LCD and a touch layer). Alternatively, cover window 704 may effectively be integrated with a display, i.e., a translucent window may be formed as at least a portion of a display. Additionally, cover window 704 may be substantially integrated with a touch sensing device such as a touch layer associated with a touch screen. In some cases, cover window 704 can serve as the outer most layer of the display.

The assembly techniques describe herein may be applied to assemble structural components used by any of a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), PDAs, remote controls, notebooks, tablet PCs, monitors, all in one computers and the like.

The various aspects, features, embodiments or implementations of the invention described above can be used alone or in various combinations.

Additional details on side protective members as well as other characteristics or features for electronic device housings are contained in: (1) U.S. application Ser. No. 12/794, 563, filed Jun. 4, 2010, and entitled "OFFSET CONTROL FOR ASSEMBLING AN ELECTRONIC DEVICE HOUSING," which is hereby incorporated herein by reference; (2) U.S. application Ser. No. 12/944,671, filed Nov. 11, 2010, and entitled "INSERT MOLDING AROUND GLASS MEMBERS FOR PORTABLE ELECTRONIC DEVICES," which is hereby incorporated herein by reference; ELECTRONIC DEVICE HOUSING," which is hereby incorporated herein by reference; (3) U.S. application Ser. No. 13/072,586, filed Mar. 25, 2011, and entitled "BONDING STRUCTURAL COMPONENTS FOR PORTABLE ELECTRONIC DEVICES USING THERMALLY ACTIVATED ADHESIVE," which is hereby incorporated herein by reference; (4) U.S. application Ser. No. 12/868,602, filed Aug. 25, 2010, and entitled "TECHNIQUES FOR MARKING A SUBSTRATE USING A PHYSICAL VAPOR DEPOSITION MATERIAL," which is hereby incorporated herein by reference; and (5) U.S. application Ser. No. 11/964,652, filed Jul. 13, 2007, and entitled "METHODS AND SYSTEMS FOR FORMING A DUAL LAYER HOUSING," which is hereby incorporated herein by reference.

In general, the steps associated with the methods of the present invention may vary widely. Steps may be added, removed, altered, combined, and reordered without departing from the spirit or the scope of the present invention.

The various aspects, features, embodiments or implementations of the invention described above may be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While embodiments and applications have been shown and described, it would be apparent to those skilled in the art having the benefit of this disclosure that many more modifications than mentioned above are possible without departing from the inventive concepts herein.

What is claimed is:

1. A method for forming a housing for a portable electronic device, the method comprising:
providing a metal housing layer for the housing for the portable electronic device;
plating substantially all of a top layer of the metal housing layer with a porous metal layer;
molding a polymer housing layer onto the porous metal layer; and
subsequently attaching one or more internal structural components internal to the housing.

2. A method as recited in claim 1, wherein the metal housing layer is an inner layer for the housing, and the polymer housing layer is an outer layer.

3. A method as recited in claim 1, wherein the polymer housing layer is an inner layer, and the metal housing layer is an outer layer for the housing.

4. A method as recited in claim 1, wherein the porous metal layer includes a plurality of pores.

5. A method as recited in claim 1, wherein the porous metal layer includes a plurality of voids or openings.

6. A method as recited in claim 1,
wherein the metal layer comprises aluminum or stainless steel, and
wherein the porous metal layer primarily includes Nickel.

7. A method as recited in claim 1, wherein the thickness of the porous metal layer is 0.5-3 microns.

8. A method as recited in claim 1, wherein the polymer housing layer comprises a polymer, and wherein the polymer is Polyphenylene Sulfide.

9. A method as recited in claim 1, wherein the housing has a thickness of less than 3 mm.

10. A method as recited in claim 1, wherein the porous metal layer comprises Nickel, Zinc and/or Copper.

11. A method as recited in claim 1, wherein the plating further comprises:
plating the metal housing layer with a first porous metal layer; and
plating a second porous metal layer on a top surface of the first porous metal layer.

12. A method as recited in claim 11, wherein the first porous metal layer is nickel and the second porous metal layer is zinc.

13. A method as recited in claim 1, wherein the molding further comprises applying a primer to the porous metal layer prior to molding the polymer housing layer onto the porous metal layer.

14. A method as recited in claim 13, wherein the primer is a hot melting primer film.

15. A method as recited in claim 12, wherein the portable electronic device is a computing device.

16. A method for forming a housing for a portable electronic device, the method comprising:
providing a metal housing layer for the housing for the portable electronic device;
plating substantially all of a top layer of the metal housing layer with a porous metal layer;
molding a polymer housing layer onto the porous metal layer; and
subsequently attaching one or more internal structural components internal to the housing on the metal housing layer,
wherein the polymer housing layer is an outer layer for the housing.

17. A method as recited in claim 16, wherein the thickness of the intermediate layer is 0.5-3 microns.

18. A method as recited in claim 16, wherein the housing has a thickness of less than 3 mm.

19. A method as recited in claim 16, wherein the plating further comprises:
plating the metal housing layer with a first porous metal layer; and
plating a second porous metal layer on a top surface of the first porous metal layer.

20. A method as recited in claim 19, wherein the first porous metal layer is nickel and the second porous metal layer is zinc.

21. A method as recited in claim 19, wherein the portable electronic device is a mobile communication device.

22. A method as recited in claim 16, wherein the molding further comprises applying a primer to the porous metal layer prior to molding the polymer housing layer onto the porous metal layer.

23. A method as recited in claim 16, wherein the porous metal layer comprises Nickel, Zinc and/or Copper.

24. A method as recited in claim 16, wherein the polymer housing layer comprises a polymer, and wherein the polymer is Polyphenylene Sulfide.

25. A method for forming a housing for a portable electronic device, the method comprising:
providing a metal housing layer for the housing for the portable electronic device;
plating the metal housing layer with a porous metal layer, the porous metal layer having a plurality of pores, the diameter of the pores is less then five microns;
injection molding a polymer housing layer onto the porous metal layer such that polymer material at least partially fills the pores of the porous metal layer; and
subsequently attaching one or more internal structural components internal to the housing.

* * * * *